United States Patent
Rijckaert et al.

[11] Patent Number: 5,270,891
[45] Date of Patent: Dec. 14, 1993

[54] VERTICALLY DISTANT MAGNETIC HEAD UNITS WITH PIEZOELECTRIC ERROR TRACKING

[75] Inventors: Albert M. A. Rijckaert; Werner A. L. Heijnemans, both of Eindhoven, Netherlands

[73] Assignee: U.S. Philips Corporation, New York, N.Y.

[21] Appl. No.: 751,285

[22] Filed: Aug. 29, 1991

[30] Foreign Application Priority Data

Sep. 4, 1990 [NL] Netherlands ............ 9001939

[51] Int. Cl.$^5$ .................................. G11B 5/52
[52] U.S. Cl. ........................ 360/107; 360/77.16; 360/130.23; 360/130.24; 360/109; 360/10.2
[58] Field of Search ............. 360/107, 77.16, 10.3, 360/77.13, 10.2, 109, 130.24, 77.12, 77.17, 103.23

[56] References Cited

U.S. PATENT DOCUMENTS

| 4,314,284 | 2/1982 | Sato et al. | 360/107 |
| 4,327,384 | 4/1982 | Tomita et al. | 360/77.17 |
| 4,369,473 | 1/1983 | Eibensteiner | 360/85 |
| 4,583,135 | 4/1986 | Kimura | 360/77.16 |
| 4,590,523 | 5/1986 | Honjo et al. | 360/77.16 |
| 4,941,061 | 7/1990 | Sung | 360/77.16 |
| 5,012,373 | 4/1991 | Saito | 360/77.16 |
| 5,047,872 | 9/1991 | Heitmann | 360/77.16 |
| 5,157,563 | 10/1992 | Nagasawa | 360/77.16 |

FOREIGN PATENT DOCUMENTS 58-154985 9/1983 Japan .

Primary Examiner—Paul M. Dzierzynski
Assistant Examiner—Kim-Kwok Chu
Attorney, Agent, or Firm—Brian J. Wieghaus

[57] ABSTRACT

In a helical-scan magnetic-tape apparatus having a scanning unit (102) comprising two diametrically opposed rotatable magnetic-head units (113, 114) which are movable over an actuating distance (A) in two opposite directions ($r_1$, $r_2$) by means of actuators (117, 118), the magnetic-head units, with the actuators not activated, are situated at a distance (X) from each other which is smaller than or equal to twice the actuating distance (A). During fast tape transport in a direction opposite to the tape transport direction with which information has been written in tracks on the magnetic tape each magnetic-head unit reads other tracks than those it would read during normal tape transport and/or the read sequence of the tracks is changed.

18 Claims, 8 Drawing Sheets

VERTICALLY DISTANT MAGNETIC HEAD UNITS WITH PIEZOELECTRIC ERROR TRACKING

BACKGROUND OF THE INVENTION

The invention relates to a magnetic-tape apparatus suitable for reading and/or writing information from-/on a magnetic tape in tracks which are inclined relative to a longitudinal direction of the magnetic tape, which apparatus has a scanning unit comprising a lower section and an upper section past which the magnetic tape is movable, which scanning unit comprises two magnetic-head units which are rotatable about an axis of rotation and which are movable by means of actuators over an actuating distance from a centre position in two opposite directions parallel to the axis of rotation, both magnetic-head units writing and/or reading one unit of information on the magnetic tape in every revolution of the two magnetic-head units, which unit of information forms an information block which has been or can be recorded on the magnetic tape in a plurality of segments, which segments comprise at least one track each.

The invention also relates to a scanning unit suitable for use in a magnetic-tape apparatus and to a method of reading an information block from a magnetic tape by means of a magnetic-tape apparatus.

Such magnetic-tape apparatuses are used for recording and reproducing inter alia video signals on/from a magnetic tape. During recording the magnetic tape is moved past the scanning unit with a specific tape transport speed, the magnetic-head units recording tracks on the magnetic tape which are inclined at a specific angle relative to the longitudinal direction of the magnetic tape.

A magnetic-tape apparatus and a method of reading an information block from a magnetic tape are known from U.S. Pat. No. 4,314,284. In this known apparatus the magnetic-head units are movable in a direction parallel to the axis of rotation by means of actuators. When the actuators are not activated both magnetic-head units rotate in the same plane and the paths of the magnetic-head units extend parallel to the tracks on the magnetic tape during tape transport with a speed equal to that with which the tracks have been recorded. If these tracks are read in a mode in which the tape transport speed deviates from that during recording the magnetic-head units will follow a path on the magnetic tape which, when the actuators are not activated, is oriented at another angle to the longitudinal direction of the magnetic tape than that parallel to the tracks on the magnetic tape (see FIG. 5). In order to realize tracking in this situation the magnetic-head units are movable from the centre position in two opposite directions parallel to the axis of rotation by means of the actuators (see FIG. 3). A disadvantage of the known apparatus is that the actuating range is not utilized to an optimum extent. In the fast forward or reverse play mode only one half of the actuator range is utilized.

SUMMARY OF THE INVENTION

It is one of the objects of the invention to provide a magnetic-tape apparatus and a method of reading an information block from a magnetic tape which utilizes the actuating distance to an optimum extent, enabling the tracks to be followed at higher tape transport speeds than possible with the known apparatus, without the actuating distance being changed.

To this end the magnetic-tape apparatus in accordance with the invention is characterized in that the centre positions of the magnetic-head units are spaced at a distance from one another in a direction parallel to the axis of rotation. The maximal tape transport speed at which the magnetic-head units can follow the tracks on the magnetic tape is dictated by the maximum possible displacement of the magnetic-head units relative to a neutral position occupied by the magnetic-head units during operation at a tape transport speed equal to that during the recording of information on the magnetic tape. In the case of a higher speed of tape transport in one of the two tape transport directions the magnetic-head units of the known apparatus move between their centre positions and one extreme position. Thus, only half the total actuating range is utilized. By arranging the centre positions of the magnetic-head units at a distance from one another (see FIG. 8) a larger part of the actuator range is employed and the magnetic-head units can be moved further out of the neutral positions, enabling a correct tracking to be realised at higher tape transport speeds.

It is to be noted that U.S. Pat. No. 4,369,473 discloses a magnetic-tape apparatus comprising four magnetic heads in a scanning unit, two of these magnetic heads being disposed in a first plane and reading and/or writing one unit of information on the magnetic tape per revolution during tape transport in a first direction and the two other magnetic heads being disposed in a second plane, spaced from the first plane, and reading and/or writing information during tape transport in a second direction of tape transport opposite to the first direction. This means that the magnetic heads for reading and/or writing a unit of information are disposed in the same plane and are not spaced from one another in a direction parallel to the axis of rotation as with the present invention.

An embodiment of the magnetic-tape apparatus in accordance with the invention is characterized in that the distance between the centre positions of the magnetic-head units is smaller than or equal to twice the actuating distance. Preferably, the distance between the centre positions of the magnetic-head units should not exceed twice the actuating distance because otherwise a correct tracking is no longer possible during operation with a tape transport speed equal to that during the recording of information on the magnetic tape. For this purpose both magnetic-head units are required to rotate in the same plane.

The invention is preferably applicable to magnetic-tape apparatuses in which the magnetic-head units are at least substantially diametrically opposed and the information block comprises two segments, transport of the magnetic tape with a first speed in a first direction being possible to record information on the magnetic tape and, during operation with tape transport in the first direction with the first speed, the first magnetic-head unit first cooperating with the first segment of the information block and the second magnetic-head unit subsequently cooperating with the second segment of the information block. In systems with two diametrically opposed magnetic-head units and two segments per information block it is possible, for a given actuating distance, to use the highest tape-transport speeds still allowing a correct tracking. Moreover, video recorder systems mainly comprise apparatuses with two diametrically opposed magnetic-head units which record the information blocks on the magnetic tape in two segments.

A further embodiment of the magnetic-tape apparatus in accordance with the invention is characterized in that the first magnetic-head unit is situated closer to the lower section than the second magnetic-head unit. With such apparatuses, when information is read from the magnetic tape during tape transport in said first direction and with a speed higher than the first speed, no complications occur and during this reading the first magnetic-head unit can first cooperate with the first segment and subsequently the second magnetic-head unit can cooperate with the second segment (see FIG. 9).

To achieve that in an apparatus in which the first magnetic-head unit is situated closer to the lower section than the second magnetic-head unit information is to be read from the magnetic tape during tape transport in a direction opposite to the first direction and even with a speed higher than the first speed and that, in addition, the first magnetic-head unit should continue to cooperate with the first segment and the second magnetic-head unit should continue to cooperate with the second segment, a further embodiment of the magnetic-tape apparatus in accordance with the invention is characterized in that the distance between the centre positions of the magnetic-head units is smaller than twice the actuating distance (see FIG. 13).

Yet another embodiment of the magnetic-tape apparatus in accordance with the invention is characterized in that the first magnetic-head unit is situated closer to the upper section than the second magnetic-head unit. In contrast with the above no complications occur with this apparatus when information is read from the magnetic tape during tape transport in a direction opposite to the first direction and even with a speed higher than the first speed, and during said tape transport the first magnetic-head unit can first continue to cooperate with the first segment and subsequently the second magnetic-head unit with the second segment (see FIG. 15).

In accordance with the invention the method of reading an information block from a magnetic tape by means of a magnetic tape apparatus in which the first magnetic-head unit is situated closer to the lower section than the second magnetic-head unit is characterized in that during tape transport in a second direction opposite to the first direction with a speed higher than the first speed the second magnetic-head unit first reads the first segment of the information block and the first magnetic-head unit subsequently reads the second segment of the information block. In this way such an apparatus is also capable of reading an information block during tape transport in the second direction (see FIG. 11).

Another method of reading an information block from a magnetic tape by means of a magnetic-tape apparatus in which the first magnetic-head unit is situated closer to the lower section than the second magnetic-head unit and in which the distance between the centre positions of the magnetic-head units is smaller than twice the actuating distance, is characterized in that during tape transport in a second direction opposite to the first direction with a second speed higher than the first speed the second magnetic-head unit first reads the second segment of the information block and the first magnetic-head unit subsequently reads the first segment of the information block. In this way such an apparatus is capable of reading an information block during tape transport in the second direction, enabling to the first magnetic-head unit to continue to cooperate with the first segment and the second magnetic-head unit to continue to cooperate with the second segment (see FIG. 13).

Yet another method of reading an information block from a magnetic tape by means of a magnetic-tape apparatus in which the first magnetic-head unit is situated closer to the upper section than the second magnetic-head unit is characterized in that during tape transport in the first direction with a second speed higher than the first speed the second magnetic-head unit first reads the first segment of the information block and the first magnetic-head unit subsequently reads the second segment of the information block. In this way such an apparatus is also capable of reading an information block during tape transport in the first direction (see FIG. 14).

BRIEF DESCRIPTION OF THE DRAWINGS

Embodiments of the apparatus and the method in accordance with the invention will now be described in more detail, by way of example, with reference to the drawings. In the drawings.

DESCRIPTION OF THE PREFERRED EMBODIMENTS

Figure 1:
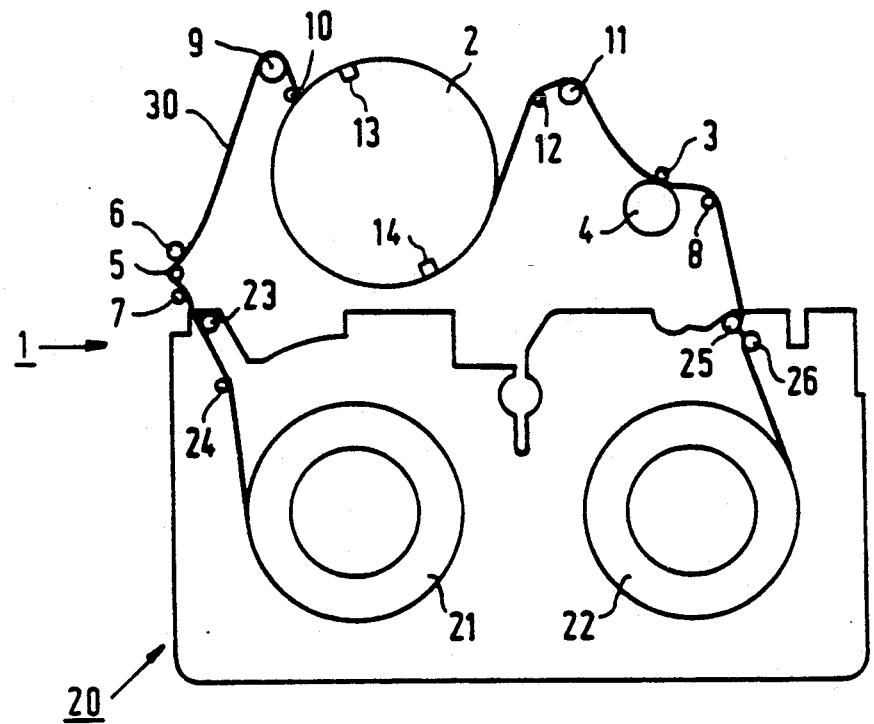
FIG. 1 is a simplified sectional view of a known magnetic-tape cassette in an operational situation in a known magnetic-tape apparatus.

FIG. 1 shows diagrammatically a magnetic-tape cassette 20 in an operational situation in a magnetic-tape apparatus 1. In the operational situation a magnetic tape 30 has been withdrawn partly from the cassette 20 by means of tape-threading elements 8, 9, 10, 11 and 12 and has been brought into contact with a scanning unit 2. Inside the cassette 20 the magnetic tape 30 is wound on reels 21, 22 and is guided by tape guides 23, 24, 25 and 26 in the cassette. The apparatus 1 has tape-transport means comprising a combination of a capstan 3 and a pressure roller 4 for the transport of the magnetic tape and further has a tape-tension sensor 5 which is movable between two further tape guides 6, 7 to control the tape tension.

Figure 2:
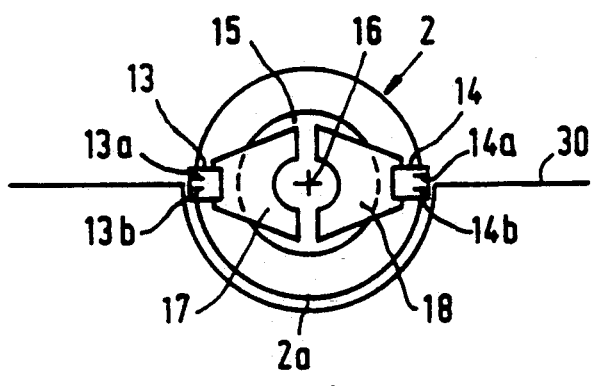
FIG. 2 is a plan view of a head disc carrying magnetic-head units of a known scanning unit of the apparatus shown in FIG. 1.

The scanning unit 2 comprises two diametrically opposed rotatable magnetic-head units 13, 14. FIG. 2 is a sectional view of the scanning unit 2 at the location of the magnetic-head units. Each magnetic-head units 13, 14 is connected to a head disc 15, which is rotatable about an axis of rotation 16, via an actuator 17, 18. The actuators are constructed as piezoceramic actuators and can move the magnetic-head units in directions parallel to the axis of rotation 16 to ensure a correct tracking of the magnetic tape 30 during tape transport at a higher or a lower speed. When the actuators 17, 18 are not activated the magnetic-head units 13, 14 are in their centre positions M and the magnetic-head units 13, 14 are rotatable in a plane 19, see FIG. 3. The actuators 17, 18 can move the magnetic-head units 13, 14 in two opposite directions $r_1$ and $r_2$. In the present example the maximum actuating distance A in each direction is 120 μm. Each magnetic-head units 13, 14 has two transducing gaps 13a, 13b and 14a, 14b respectively for reading and/or writing information from/on the magnetic tape 30. The two gaps of a magnetic-head unit have an opposite azimuth (for example +15° and −15°). In the operational situation the magnetic tape 30 is wrapped around a circumferential surface 2a of the scanning unit 2 along a helical path through an angle of 180°. In half a revolution of the magnetic-head units a track pair containing one half of an information block 31 is written or read. In a first half revolution a first segment 33 of the information block 31 is written by the first magnetic-head unit 13 and in a second half revolution a second segment 34 is written by the second magnetic-head unit 14. The track pattern on the magnetic tape is as diagrammatically shown in FIG. 4. In the present example the width of a track 32 is 10 μm. During recording of the tracks tape transport is effected in a first direction D1 with a first speed Vo and the speed vector of the magnetic-head units relative to the magnetic tape at said tape transport speed Vo is $V_h$. The tracks 32 are inclined at an angle a relative to the longitudinal direction d of the magnetic tape.

During tape transport at a second speed V higher than the first speed Vo the two segments 33, 34 of one information block are always read and subsequently a number of information blocks are skipped.

Figure 5:
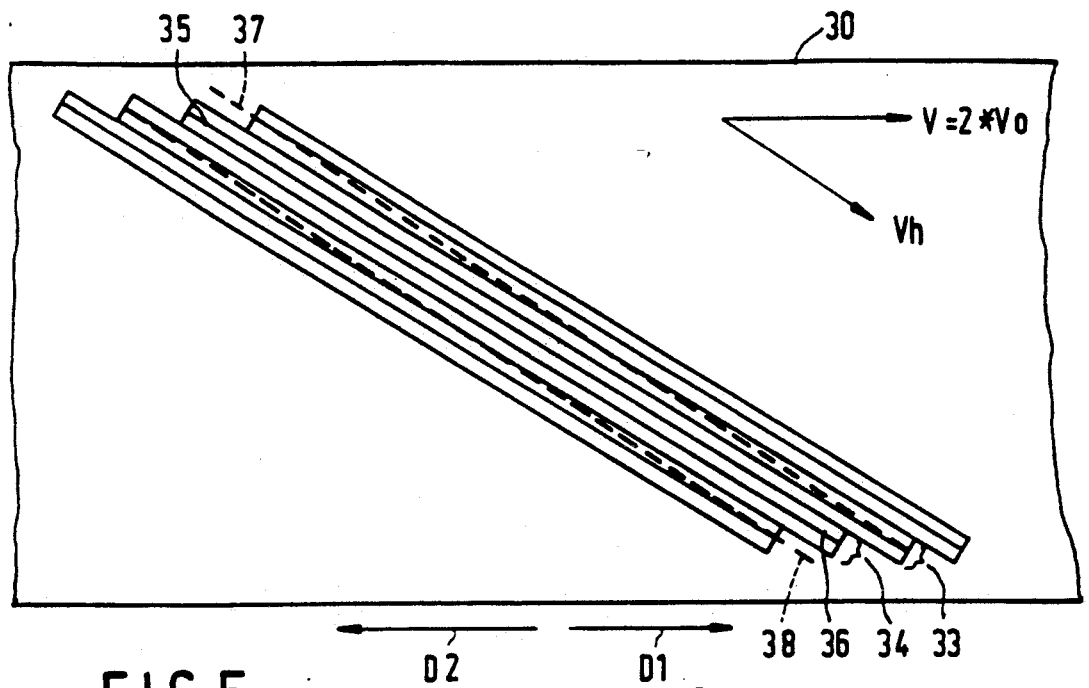
FIG. 5 shows the path of the magnetic-head units relative to the tracks on the magnetic tape during tape transport at a higher speed.
Figure 6:
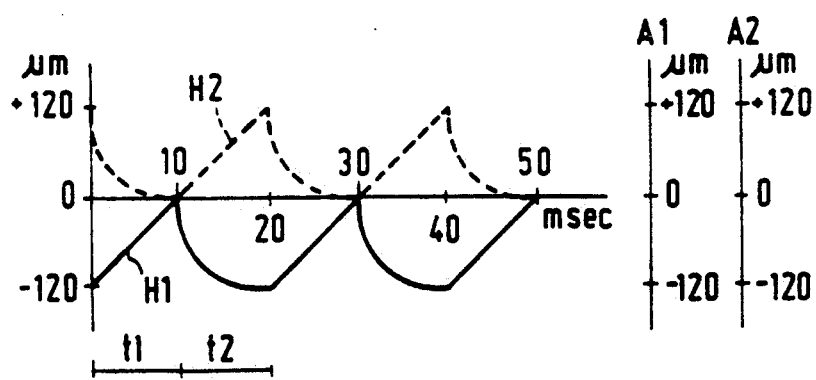
FIG. 6 shows the displacements of the magnetic-head units of the known apparatus as a function of time.
Figure 7:
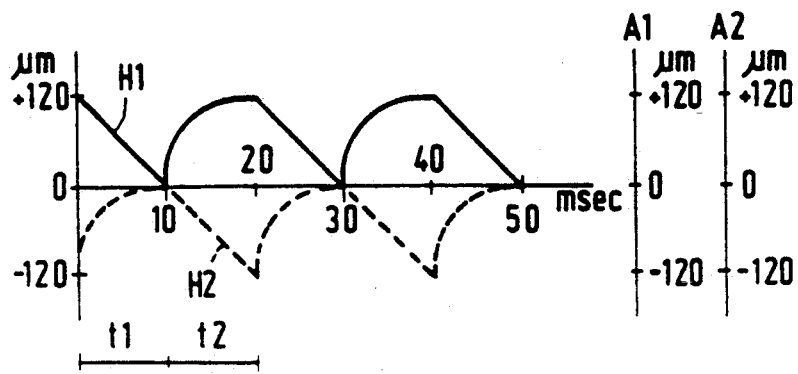
FIG. 7 shows the displacements of the magnetic-head units in the same way as in FIG. 6 but now during tape transport at a higher speed in the opposite direction.

The lines 37 and 38 in FIG. 5 represent the paths of the first and the second magnetic-head unit respectively when the actuators are not activated and the tape transport speed V is 2*Vo. The lines 35 and 36 represent the paths of the first magnetic-head unit 13 and the second magnetic-head unit 14 respectively in the case that the tape transport speed is equal to the first speed Vo. The segments 33 and 34 have been written on the magnetic tape 30 by the magnetic-head units 13 and 14 at the first speed Vo. It is assumed that at the end of the path 37 of the first magnetic-head unit 13 over the magnetic tape 30 and at the beginning of the path 38 of the second magnetic-head unit 14 over the magnetic tape 30 the centre of the magnetic-head units 13, 14 coincides with the centre of the width of the segments 33 and 34. The paths 35 and 36 also represent the central axes of the segments 33 and 34 respectively. This means that the path 37 begins too high and should be moved down over the width of one segment (20 μm) at the beginning. The path 38 begins correctly but towards the end it should be moved up over the width of one segment. For a tape transport speed of n*Vo this means that a displacement of (n−1)*20 μm is required for the magnetic-head unit to allow a segment to be read correctly. When the tape is stationary the situation is opposite to that in the case of a tape transport speed of 2*Vo. For a tape transport speed of −n*Vo, i.e. tape transport at a higher speed in a second direction D2 opposite to the first direction D1, the displacement required for the magnetic-head unit should therefore be (n+1)*20 μm. In the case of high-speed tape transport in the first direction D1 a maximum speed of 7*Vo is permissible for a correct tracking of the segments (width 20 μm) with a maximum actuating distance of + or −120 μm. FIG. 6 shows the displacements $H_1$, $H_2$ in this case of the first and the second magnetic-head units 13, 14 as a function of time. The magnetic-head units then rotate with 3000 revolutions per minute, which means that one segment is read in 10 milliseconds. FIG. 6 also shows the ranges $A_1$, $A_2$ of the first actuator 17 and the second actuator 18 respectively relative to the plane 19. This plane 19 corresponds to the horizontal axis where the displacement of the magnetic-head units is zero. The intervals $t_1$ and $t_2$ are the time intervals in which the first segment and the second segment are read respectively. In the case of high-speed tape transport in the second direction D2 a maximum speed of 5*Vo is allowed for a correct tracking of the segments. FIG. 7 shows the displacements $H_1$ and $H_2$ of the magnetic-head units 13, 14 in the last-mentioned case.

The magnetic-tape apparatus described above with the scanning unit 2 and the manner in which the actuators 17, 18 should be driven and the magnetic-head units 13, 14 should be moved to ensure a correct tracking of the magnetic tape 30 during tape transport at a higher speed are generally known. FIGS. 6 and 7 show that the known apparatuses employ only half the maximum range of the actuators 17 and 18. During high-speed tape transport the actuators only use the range from 0 to +120 μm or from 0 to −120 μm. If the actuators utilise the entire range at the maximum search speed this will yield a higher speed.

Figure 8:
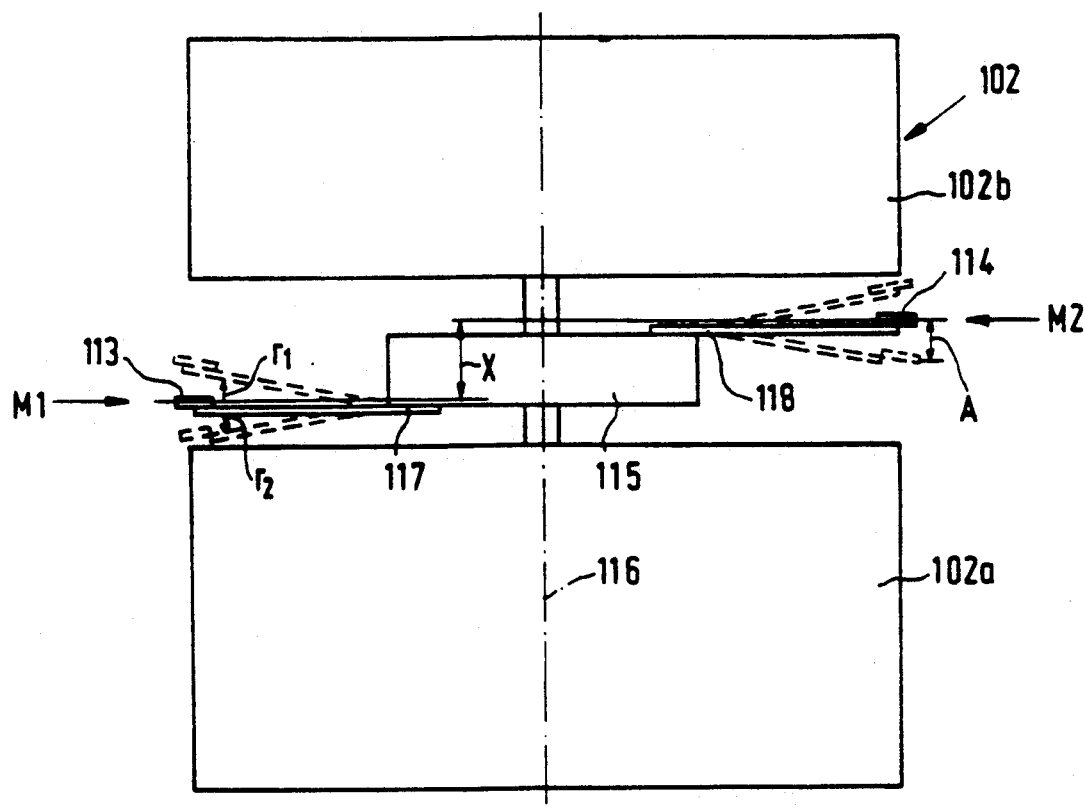
FIG. 8 is a view of a scanning unit in accordance with the invention, in which the magnetic-head units are spaced at a distance from one another.

FIG. 8 shows a scanning unit 102 of a magnetic-tape apparatus in accordance with the invention. This apparatus corresponds to the apparatus shown in FIG. 1. The only difference with the known apparatus resides in the scanning unit with associated electronics. This scanning unit 102 has a lower section 102a and an upper section 102b and comprises two magnetic-head units 113 and 114. In a situation which will now be considered first the first magnetic-head unit 113 is situated closer to the lower section 102a than the second magnetic-head unit 114. By means of actuators 117 and 118 the magnetic-head units are connected to a rotatable head disc 115. When the actuators are not energized the magnetic-head units are in their centre positions $M_1$, $M_2$ and the magnetic-head units 113 and 114 are not disposed in one plane, as is the case in FIG. 3, but they are spaced at a distance X of 240 μm from one another in the direction of the axis of rotation 116. In the case of tape transport with the first speed Vo (recording and reproduction) there should not be any difference in level between the first magnetic-head unit 113 and the second magnetic-head unit 114. In this situation the first actuator 117 should produce an excursion of +120 μm and the second actuator 118 should produce an excursion of −120 μm.

Figure 9:
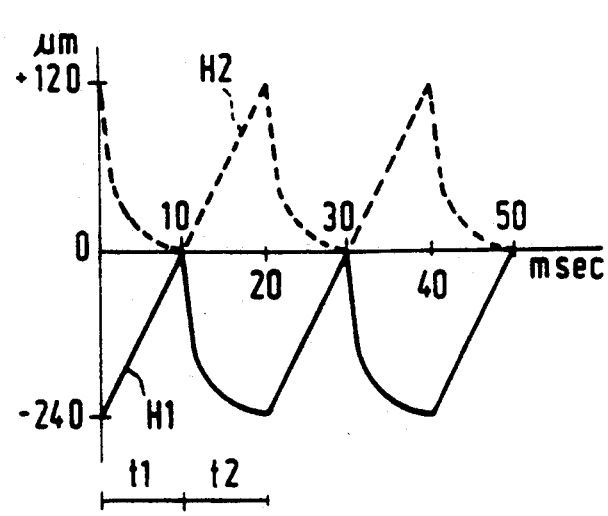
FIG. 9 shows the displacements of the magnetic-head units of the scanning unit shown in FIG. 8 during tape transport at a higher speed.
Figure 9:
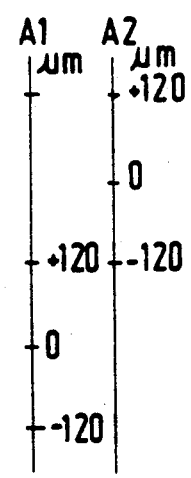

FIG. 9 illustrates the situation for a tape transport with a speed of 13 * Vo in the first direction D1 with an optimum use of the actuator range. When the actuators are not energized the difference in level between the two magnetic-head units is now 240 μm.

Figure 10:
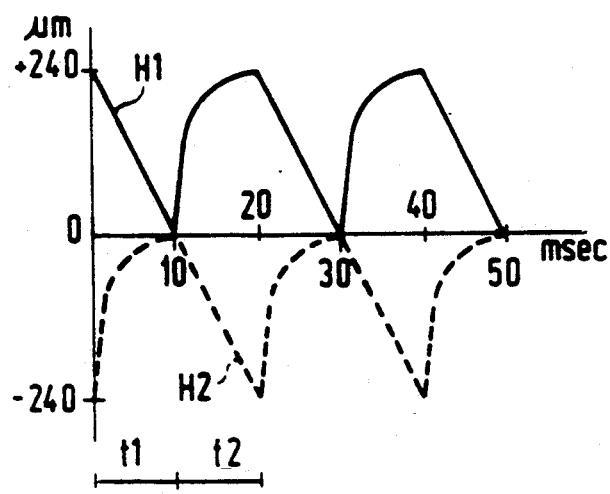
FIG. 10 shows displacements similar to those in FIG. 9 but now during tape transport in the opposite direction.
Figure 10:
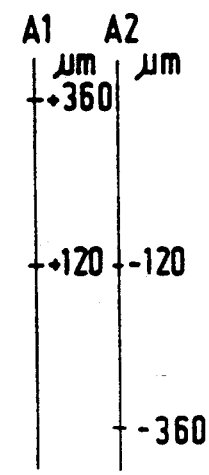

During the rearward search movement problems arise as illustrated in FIG. 10 for a tape transport speed of 11 * Vo in the second direction D2. The required actuator excursion should now be larger than 120 μm. The above problem is solved by the embodiments of the magnetic-tape apparatus in accordance with the invention described below.

Figure 11:
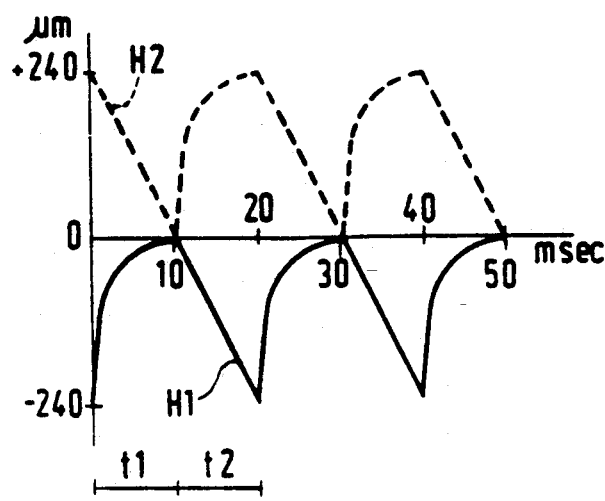
FIG. 11 shows displacements similar to those in FIG. 10 but now in the case that each magnetic-head unit reads another segment.
Figure 11:
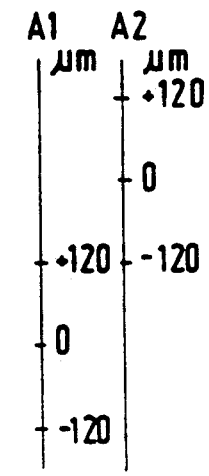

In the first embodiment during the rearward search movement, i.e. during tape transport with a second speed V in the second direction D2, the first segment 33 is no longer read by the first magnetic-head unit 113 and the second segment 34 is no longer read by the second magnetic-head unit 114 as above, but the other way around, as illustrated in FIG. 11. The first segment 33 is now read by the second magnetic-head unit 114 during the interval $t_1$, the displacement of the second magnetic-head unit being represented by the line H2, and the second segment 34 is now read by the first magnetic-head unit 113 during the interval $t_2$, the displacement of the first magnetic-head unit being represented by the line H1. Both actuator displacements A1, A2 now remain within their maximum ranges. By maintaining the time relationship between the segments being read and an external frequency the phase of the head disc 115 relative to this reference should be shifted through 180°. Thus, if for speeds in the second direction D2 the magnetic-head units are interchanged search speeds between −11 * Vo and +13 * Vo are possible.

Figure 12:
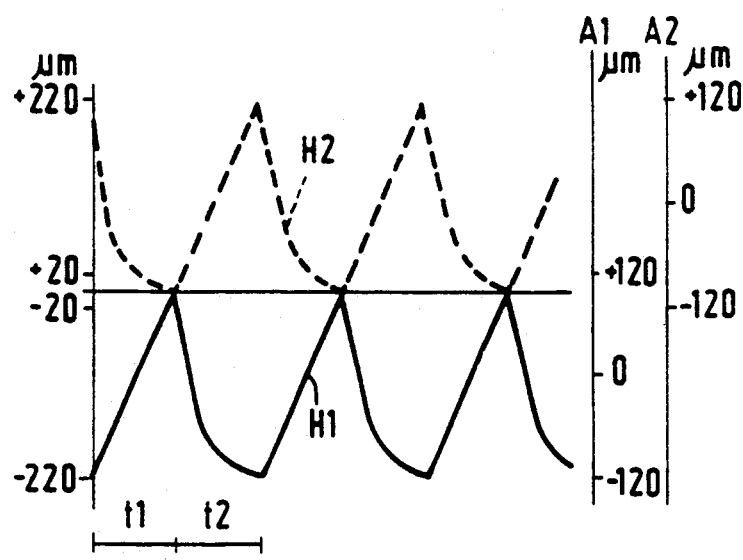
FIG. 12 shows the displacements of the magnetic-head units during tape transport at a higher speed for a scanning unit in accordance with the invention in which the distance between the magnetic-head units is smaller than that in FIGS. 9, 10 and 11.
Figure 13:
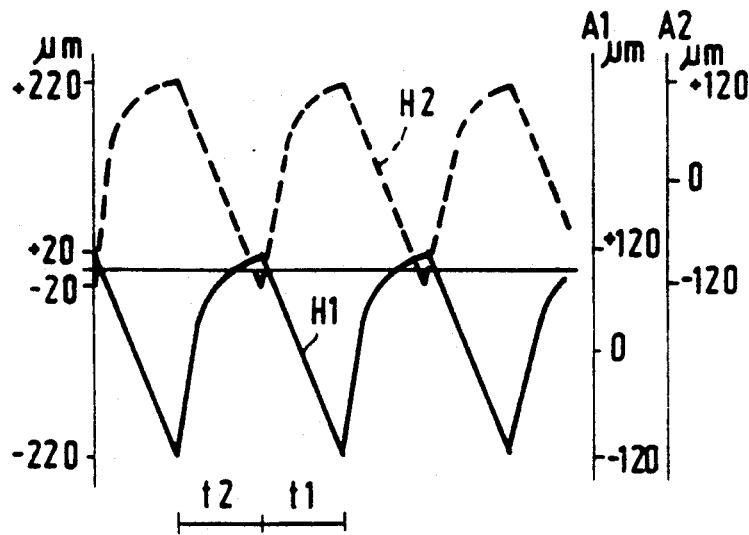
FIG. 13 shows displacements of the magnetic-head units similar to those in FIG. 12 but now during tape transport at a higher speed in the opposite direction.

The second embodiment employs another solution. In this case the first magnetic-head unit 113 continues to read the first segment 33 and the second magnetic-head unit 114 continues to read the second segment 34 but the second segment 34 is read first and after this the associated first segment 33. This situation is illustrated in FIG. 13. For a correct tracking it is necessary in this situation that the distance X (see FIG. 8) is smaller than twice the actuating distance, i.e. smaller than 240 μm in this example. FIGS. 12 and 13 show the displacements H1 and H2 of the first magnetic-head unit 113 and the second magnetic-head unit 114 respectively, the distance X between the magnetic-head units being 200 μm. However, the maximum possible search speed in the first direction is now smaller. It is 11 * Vo (FIG. 11). For a high-speed tape transport in the second direction a tape transport speed of 11 * Vo is possible, in the same way as before. In the present case, however, a memory is necessary to restore the correct sequence of the segments. If the difference in level between the two magnetic-head units 113 and 114 is the other way around the change is necessary for tape transport in the first direction D1. In this situation the magnetic-head unit 114 in FIG. 8 will be the first magnetic-head unit and the magnetic-head unit 113 will be the second magnetic-head unit, so that the first magnetic-head unit 114 is situated closer to the upper section 102b than the second magnetic-head unit 113. This choice may be more favourable because no change is necessary for stop motion, slow motion and reverse (−1 * Vo).

Figure 14:
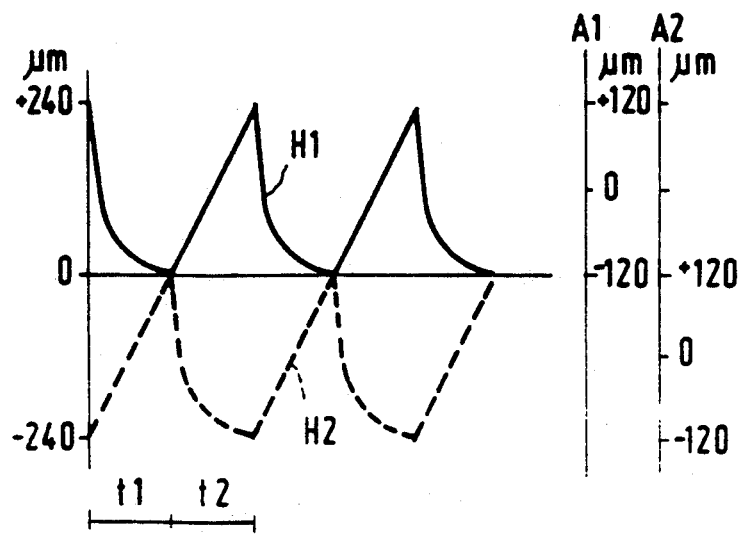
FIG. 14 shows the displacements of the magnetic-head units during tape transport at a higher speed for a scanning unit in accordance with the invention in which the positions of the magnetic-head units have been interchanged.
Figure 15:
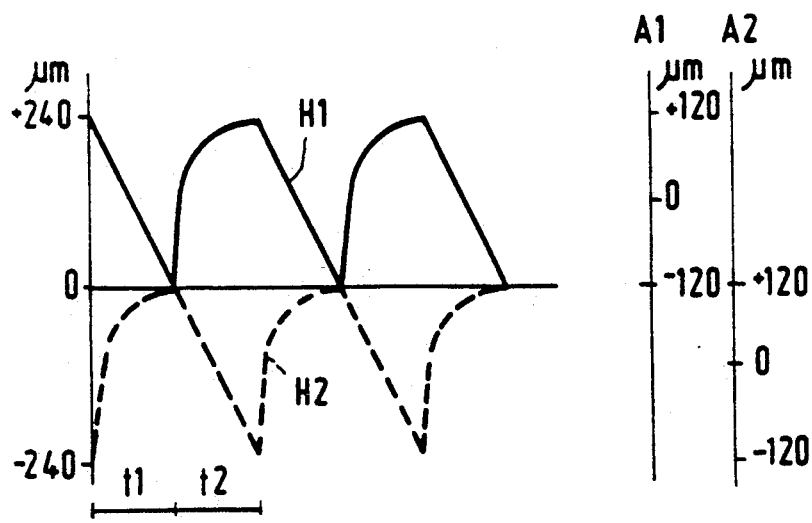
FIG. 15 shows displacements of the magnetic-head units similar to those in FIG. 14 but now during tape transport at a higher speed in the opposite direction.

FIGS. 14 and 15 show the displacements H1 and H2 of the first magnetic-head unit 114 and the second magnetic-head unit 113 respectively. It is shown clearly that for tape transport in the first direction D1 the second magnetic-head unit 113 first reads the first segment during the interval $t_1$ and the first magnetic-head unit 114 subsequently reads the second segment during the interval $t_2$, see FIG. 14. FIG. 15 illustrates the displacements H1, H2 of the magnetic-head units during tape transport in the second direction D2, where no change is needed. The maximum possible tape transport speeds are 13 * Vo for tape transport in the first direction (FIG. 14) and 11 * Vo for tape transport in the second direction (FIG. 15).

Figure 16:
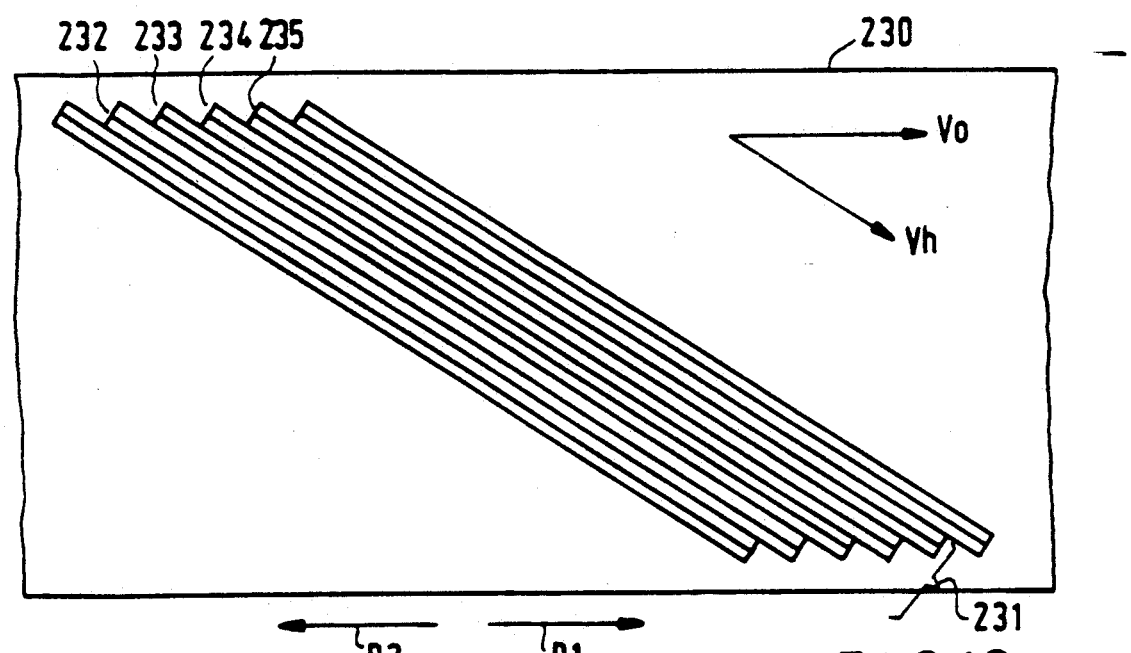
FIG. 16 shows the positions of the segments of an information block for four segments.

The embodiments described so far are based on an information block comprising two segments. However, the invention is not limited to these embodiments. The information block may also comprise four or more segments. FIG. 16 shows the positions of four segments 232, 233, 234 and 235 on a magnetic tape 230, which segments form an information block 231.

Figure 3:
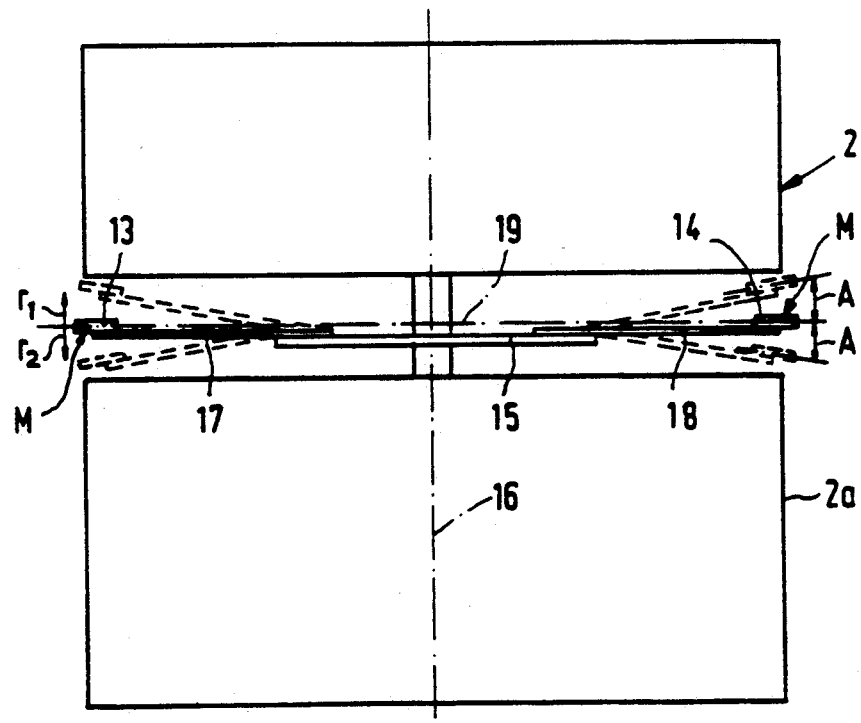
FIG. 3 is a view of the known scanning unit, showing the range of the actuators to an exaggerated scale.
Figure 4:
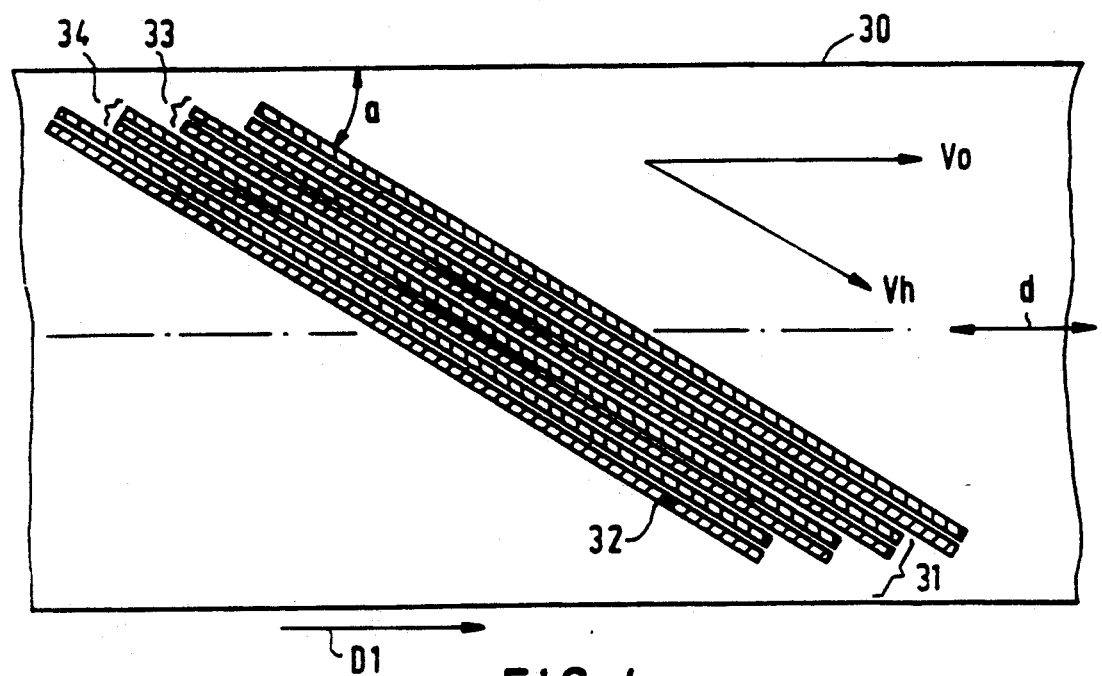
FIG. 4 shows the positions of tracks of segments belonging to an information block.
Figure 17:
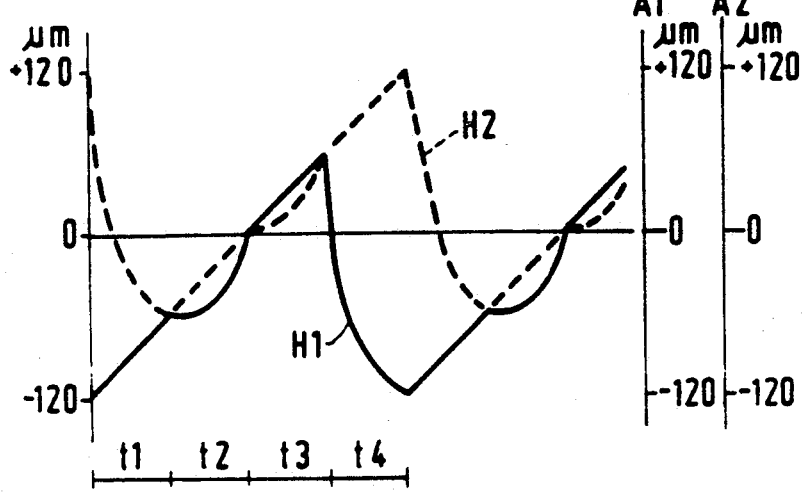
FIG. 17 shows the displacements of the magnetic-head units for reading an information block made up of segments as shown in FIG. 16 during tape transport at a higher speed.
Figure 18:
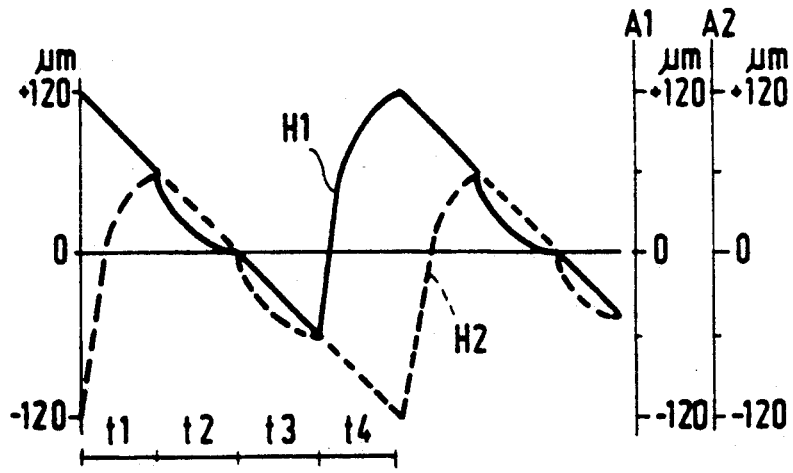
FIG. 18 shows displacements of the magnetic-head units similar to those in FIG. 17 but now in the case of tape transport at a higher speed in the opposite direction.

FIGS. 17 and 18 show the displacements H1 and H2 of the first magnetic-head unit 13 and the second magnetic-head unit 14 respectively of the known scanning unit 2 (FIG. 3). FIG. 17 illustrates the situation during fast tape transport in the first direction D1. The maximum speed in the first direction for which the tracks of the segments can still be followed correctly is 4 * Vo for the known scanning unit, which situation is illustrated in FIG. 17. FIG. 18 shows the situation in the case of fast tape transport in the second direction D2. The maximum possible speed is then 2 * Vo, which is the situation illustrated in FIG. 18.

Figure 19:
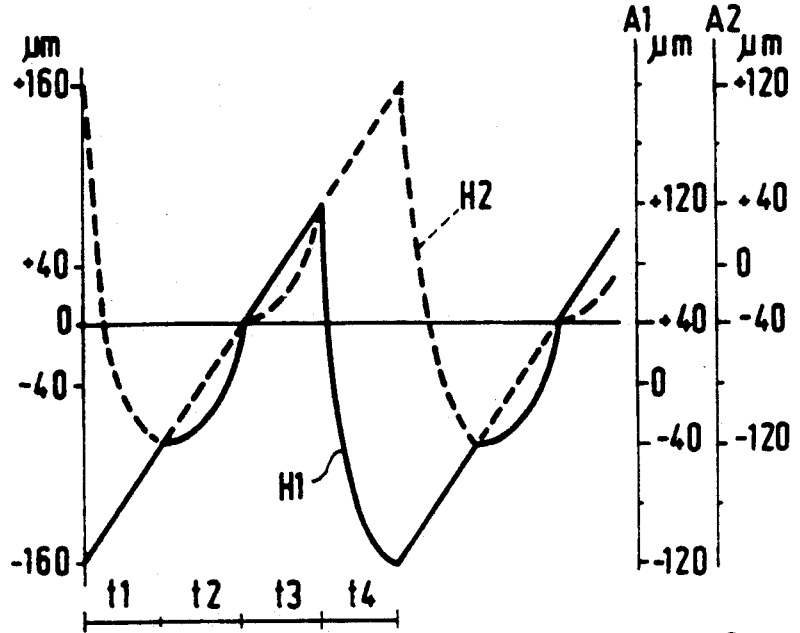
FIG. 19 shows the displacements of the magnetic-head units during tape transport at a higher speed for a scanning unit in which the distance between the magnetic-head units is smaller than in FIGS. 17 and 18.
Figure 20:
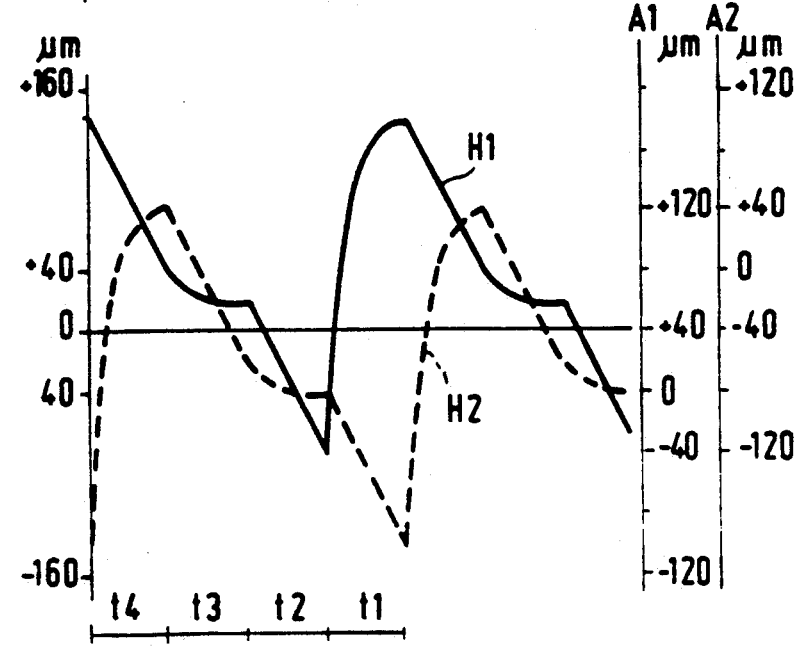
FIG. 20 shows displacements of the magnetic-head units similar to those in FIG. 19 but now in the case of tape transport at a higher speed in the opposite direction.

In the case of four segments in every information block it is also possible to obtain higher search speeds by arranging the magnetic-head units at a distance from one another with the actuators not activated. FIGS. 19 and 20 give the displacements H1 and H2 of the magnetic-head units 113 and 114 in the scanning unit 102 as shown in FIG. 8.

The first magnetic-head unit 113 is now situated closer to the lower section 102a than the second magnetic-head unit 114. In this case the distance X between the magnetic-head units should be smaller than twice the maximum actuating distance.

The optimum distance X for this embodiment is 80 μm. In the case of tape transport in the first direction D1 this enables a maximum speed of 5 * Vo to be obtained for which the tracking is still correct, see FIG. 19. If in the case of tape transport in the second direction D2 the first magnetic-head unit 113 reads those segments which have been recorded by means of the second magnetic-head unit 114 or which are read by the second magnetic-head unit 114 during tape transport with the first speed Vo in the first direction, and the other segments of the information block are read by the second magnetic-head unit 114 a maximum speed of 4 * Vo can be attained, see FIG. 20.

It is obvious that the tracking system should be adapted to the described techniques. U.S. Pat. No. 4,597,023; (herewith incorporated by reference) describes a system and provides the required information.

It is to be noted that the invention is not limited to the embodiments described herein. The magnetic-head units may alternatively comprise only one or more than two transducing gaps and the segments may accordingly comprise one or more than two tracks. Moreover, the dimensions of the tracks and the actuator ranges may be chosen differently.

We claim:

1. A helical scan magnetic-tape apparatus having a helical scan scanning unit with an axis of rotation and comprising two magnetic-head units which are rotatable about the axis of rotation of the scanning unit, and actuators actuatable over an actuating distance for displacing each magnetic-head unit from a center position, in which the actuator is not actuated, in two opposite directions over the actuating distance and parallel to the axis of rotation, characterized in that:

the center positions of the magnetic-head units are spaced from each other in a direction parallel to the axis of rotation.

2. A magnetic-tape apparatus as claimed in claim 1, characterized in that the spacing between the center positions of the magnetic-head units is smaller than or equal to twice the actuating distance of the actuators.

3. A magnetic-tape apparatus as claimed in claim 1 or 2, characterized in that:

the magnetic-head units are at least substantially diametrically opposed on the scanning unit; and
the apparatus includes tape transport means for transport of the magnetic tape with a first speed in a first direction helically past the scanning unit, and recording means for recording one unit of information on the magnetic tape in every revolution of the two magnetic-head units, which unit of information each forms an information block having two segments, which segments each comprise at least one track; and,
during operation with tape transport in the first direction with the first speed, the first magnetic-head unit first recording the first segment of the information block on the tape and the second magnetic-head unit subsequently recording the second segment of the information block on the tape adjacent the first segment.

4. A magnetic-tape apparatus as claimed in claim 3, characterized in that: the scanning unit includes first and second axially spaced sections past which the tape is helically transported during tape transport, the first section being closest to the first segment and the second section being closest to the second segment, and the first magnetic-head unit is situated closer to the second section of said scanning unit than the second magnetic-head unit.

5. A magnetic tape apparatus according to claim 4, wherein said tape transport means is adapted for transporting the magnetic tape in a second direction opposite the first direction with a second speed higher than the first speed, and said apparatus further comprises read means for reading the first segment of the information block with the second magnetic head unit and subsequently reading the second segment of the information block with the first magnetic head unit during transport of the magnetic tape in the second direction with the second, higher speed.

6. A magnetic-tape apparatus as claimed in claim 4, characterized in that the spacing between the center positions of the magnetic-head units is smaller than twice the actuating distance of the activators.

7. A magnetic tape apparatus according to claim 6, wherein said tape transport means is adapted for transporting the magnetic tape in a second direction opposite the first direction with a second speed higher than the first speed, and said apparatus further comprises read means for first reading the second segment of the information block with the second magnetic head unit and subsequently reading the first segment of the information block with the first magnetic head unit during transport of the magnetic tape in the second transport direction with the second, higher speed.

8. A magnetic-tape apparatus as claimed in claim 3, characterized in that: the scanning unit includes first and second axially spaced sections past which the tape is helically transported during tape transport, the first section being closest to the first segment and the second section being closest to the second segment, and the first magnetic-head unit is situated closer to the first section of the scanning unit than the second magnetic-head unit.

9. A magnetic tape apparatus according to claim 8, wherein said tape transport means is adapted for transporting the magnetic tape in the first direction with a second speed higher than the first speed, and said apparatus further comprises read means for first reading the first segment of the information block with the second magnetic head unit and subsequently reading the second segment of the information block with the first magnetic head unit during transport of the magnetic tape in the first transport direction with the second, higher speed.

10. A method of reading information from a magnetic tape recorded in a first tape direction at a first tape speed in a plurality of information blocks extending at an acute angle to the length dimension of the magnetic tape, each information block including first and second adjacent segments each sequentially recorded by a first and second magnetic head, respectively, during a single rotation of the magnetic heads, said method comprising:

a) providing a scanning unit having first and second magnetic heads rotatable about an axis of rotation of the scanning unit and two actuators, each actuatable over an actuating distance, for moving a respective magnetic head over the actuating distance from a center position in two opposite directions over the actuating distance and parallel to said axis of rotation, said center positions of the magnetic head being spaced from each other in a direction parallel to said axis of rotation, b) transporting the tape past the scanning unit with a speed faster than the tape speed with which the tape was transported past the scanning unit during recording of the segments of the information block on the tape, and c) reading the segments of each information block with the magnetic heads by switching at least one of (i) the correspondence between magnetic heads and the recorded segment and (ii) the sequential order of reading the segments of the information block.

11. A method according to claim 10, wherein:

said first magnetic head is situated closer to the second segment along the axis of rotation of the scanning unit than the second magnetic head, a tape is transported in a second direction opposite to the first direction with a speed higher than the first speed, and the second magnetic-head first reads the first segment of the information block and the first magnetic-head subsequently reads the second segment of the information block.

12. A method according to claim 10, wherein:

the spacing between the center positions of the magnetic heads is smaller than twice the actuating distance, the tape is transported in a second direction opposite to the first direction with a second speed higher than the first speed, and the second magnetic-head first reads the second segment of the information block and the first magnetic-head subsequently reads the first segment of the information block.

13. A method according to claim 10, wherein:

the first magnetic head is situated closer to the first segment along the axis of rotation of the scanning unit than the second magnetic head, the tape is transported in the first direction with a second speed higher than the first speed, and the second magnetic-head unit first reads the first segment of the information block and the first magnetic-head unit subsequently reads the second segment of the information block.

14. A scanning unit for a helical scan magnetic tape apparatus, said scanning unit comprising:

two magnetic heads rotatable about an axis of rotation of the scanning unit;

two actuators, each connected to a respective magnetic head and actuatable over an actuating distance, for moving a respective magnetic head over said actuating distance from a center position, in which said actuators are not actuated, in two opposite directions over said actuating distance and parallel to said axis of rotation, said center positions of the magnetic head units being spaced from each other in a direction parallel to said axis of rotation.

15. A scanning unit as claimed in claim 14, wherein said spacing between the center positions of the magnetic heads is smaller than or equal to twice said actuating distance.

16. A scanning unit as claimed in claim 15, characterized in that:

said magnetic-heads are at least substantially diametrically opposed on said scanning unit.

17. A scanning unit as claimed in claim 14, characterized in that:

said magnetic-heads are at least substantially diametrically opposed on said scanning unit.

18. A scanning unit apparatus as claimed in claim 14, characterized in that the spacing between the center positions of the magnetic-heads is smaller than twice the actuating distance.

* * * * *